(12) United States Patent
Kleideiter et al.

(10) Patent No.: US 7,651,774 B2
(45) Date of Patent: Jan. 26, 2010

(54) GLASS COATING

(75) Inventors: Gerd Kleideiter, Bessenbach (DE); Anton Zmelty, Hosbach (DE); Michael Geisler, Wachtersbach (DE)

(73) Assignee: Applied Materials GmbH & Co., KG, Alzenau (DE)

( * ) Notice: Subject to any disclaimer, the term of this patent is extended or adjusted under 35 U.S.C. 154(b) by 0 days.

(21) Appl. No.: 11/012,085

(22) Filed: Dec. 13, 2004

(65) Prior Publication Data
US 2006/0083932 A1    Apr. 20, 2006

(30) Foreign Application Priority Data
Oct. 19, 2004    (EP) .................. 04024814

(51) Int. Cl.
*B32B 17/06* (2006.01)
*B05D 7/00* (2006.01)

(52) U.S. Cl. .............. 428/426; 428/432; 428/698; 427/533; 427/419.3

(58) Field of Classification Search ........... None
See application file for complete search history.

(56) References Cited

U.S. PATENT DOCUMENTS

| 6,180,247 B1 | 1/2001 | Szczyrbowski et al. |
| 6,844,976 B1 * | 1/2005 | Firon et al. .......... 359/586 |
| 2004/0005472 A1 * | 1/2004 | Arnaud et al. ........ 428/472 |

FOREIGN PATENT DOCUMENTS

| DE | 42 11 363 A1 | 10/1993 |
| WO | WO-95/29883 | 11/1995 |

* cited by examiner

*Primary Examiner*—Timothy M Speer
(74) *Attorney, Agent, or Firm*—Fulbright & Jaworski, L.L.P.

(57) ABSTRACT

The invention relates to a glass coating and a method for the production of this glass coating. The glass coating comprises a first layer of ZnO and a second layer of Ag disposed thereon. Before the Ag layer is applied onto the ZnO layer, the latter is irradiated with ions.

19 Claims, 1 Drawing Sheet

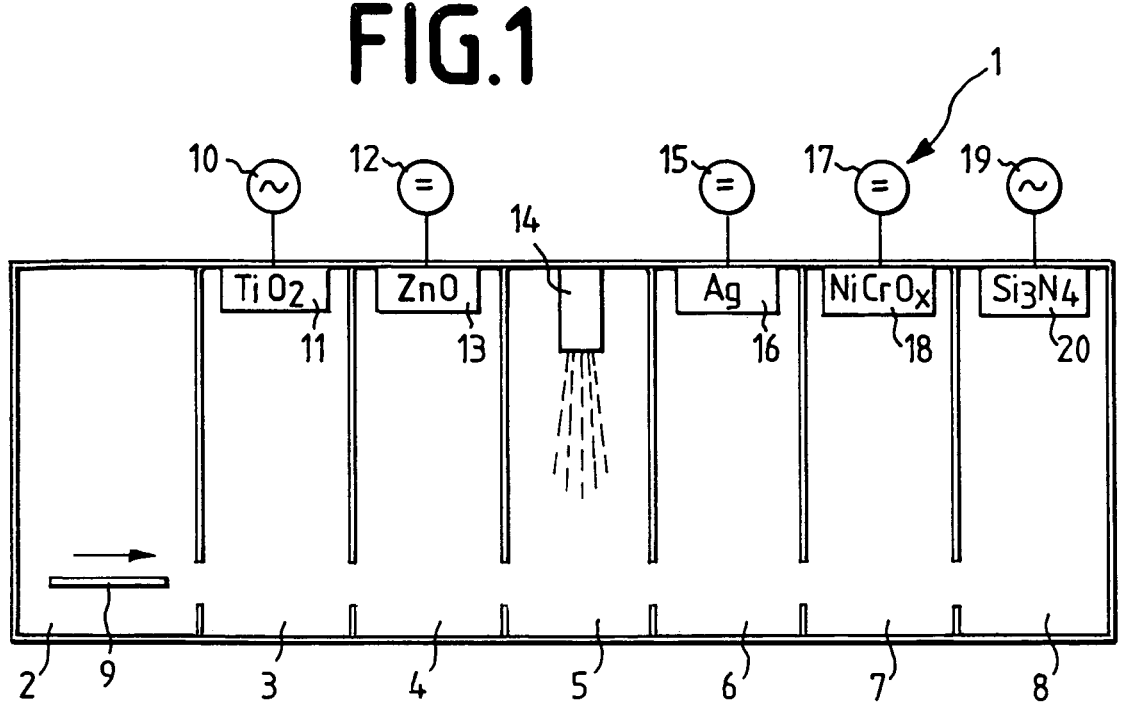
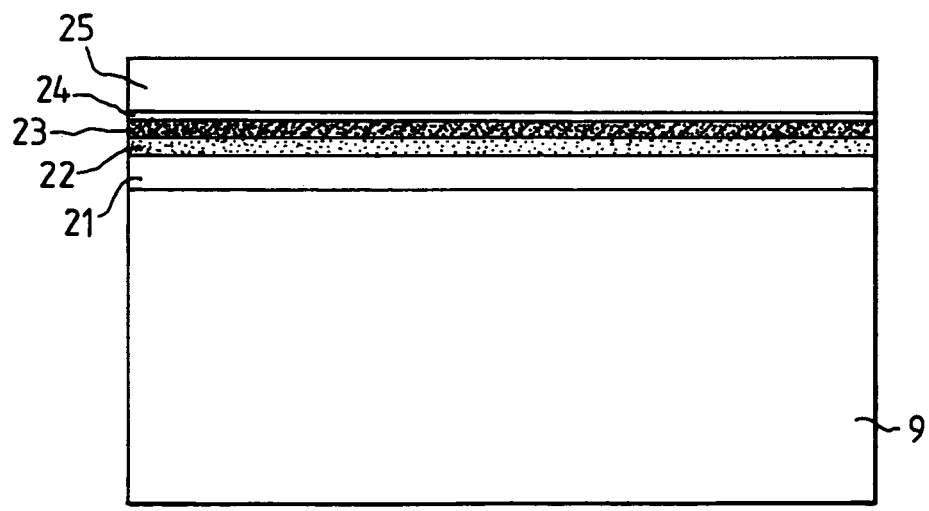

GLASS COATING

BACKGROUND AND SUMMARY

This application claims priority from European Patent Application No. 04 024 814.8 filed Oct. 19, 2004, hereby incorporated by reference in its entirety.

The invention relates to a glass coating.

Coatings of architectural glass serve the purpose of reflecting or absorbing certain wavelengths or wavelength ranges of daylight such, that the light entering the room through the windows differs from the light outside the room.

An important function of such coatings consists in reflecting heat radiation in order for rooms not to be heated too much in the summer and not to cool down too much in the winter. But herein the transmission of visible light should not be significantly reduced, i.e. the coating should have high transmission in the visible range and high reflection for heat or infrared radiation.

Coating systems fulfilling this function are referred to as Low-E coating systems, where "E" represents "emissivity".

A Low-E coating system is already known, which comprises as the substrate a glass pane of mineral glass on which five individual layers are disposed one above the other (DE 42 113 63 A1). On this substrate is disposed a first layer of ZnO with a thickness of 400 Å. On this first layer is applied a second layer of Ag having a thickness of 90 Å. A third layer, disposed on the second layer, is comprised of one of the metals Ti or NiCr of a thickness of approximately 15 Å. Onto this third layer is applied a fourth layer comprised of ZnO and having a thickness of 320 Å. Onto the fourth layer, lastly, is applied a fifth layer of $TiO_2$ with a thickness of 70 Å. The thin layer of silver is here essentially the layer reflecting the infrared light.

A further coating transparent to visible light and reflecting infrared light is disclosed in WO 95/29883. This coating is applied on a glass substrate and is also comprised of at least five layers. As the first layer on this glass substrate is applied an oxide, for example zinc oxide, tin oxide, indium oxide, etc. The second is formed by a silver film, while the third layer is a metal layer, which protects the subjacent silver layer during a sputtering process. Following it is a further metal oxide layer, which prevents the silver layer from oxidizing. The fifth and last layer is formed by a silicon nitride layer.

Further known is a thermally insulating coating system, which is suitable for curved panes (DE 198 50 023 A1=U.S. Pat. No. 6,180,247 B1). This coating system is comprised of at least one coating of a noble metal enclosed in protective layers. Such a coating system can specifically be comprised of $TiO_2$—$NiCrO_x$—$TiO_2$—Ag—$NiCrO_x$—$Si_3N_4$.

Improvement of thermal insulation has so far only been achieved by means of complicated double silver or split silver coating systems.

The object of the invention is to improve the thermal insulation of a substrate coating with high transmission of visible light without increasing the thickness of a layer reflecting heat radiation.

This object is achieved according to the characteristics of patent claim 1.

The invention relates to a glass coating and a method for the production of this glass coating. The glass coating comprises a first layer of ZnO and a second layer of Ag disposed thereon. Before the Ag layer is applied onto the ZnO layer, the latter is irradiated with ions.

The advantage achieved with the invention lies particularly therein that through a special pretreatment of that layer on which the silver layer is applied, the epitaxial growth of the layer reflecting the heat radiation is affected such, that its surface resistance is decreased by up to 20% without having to apply more material. The layer reflecting the heat radiation is here preferably silver and the layer onto which the silver is applied, is preferably ZnO. The pretreatment of this ZnO preferably is carried out by ion bombardment.

To the silver can be mixed small quantities—less than 10 percent by weight—of Cu, Al, Nd, In, Yt, Sb, V and the like. Alternatively to ZnO or ZnO:Al, for example NiCr, $NiCrO_x$, $TiO_x$, $TiO_2$, W, WO, $WO_x$, Zr, $ZrO_x$, ZrO can be used for the epitaxial growth layer.

In a preferred embodiment, the infrared radiation-reflecting layer includes a material with a silver fraction of at least 50%.

In another preferred embodiment, the layer treated by ion irradiation contains of a material with a ZnO fraction of at least 50%.

In another embodiments, the layer treated by ion irradiation includes $ZnO_x$ or ZnO:Al or Zn:$AlO_x$, wherein $0<x\leqq1$.

In comparison to double silver or split silver Low-E coating systems, the invention permits faster production, since fewer individual layers and less complicated processes are required. The production is also more cost-effective since less target material and fewer cathodes are required. The coating installations can overall be laid out smaller. The simple coating system yields fewer rejects and requires less maintenance effort, lower expenditures and less consumable material. In comparison to single-silver Low-E coating systems, the products fabricated according to the invention have better functionality. In a tempered coating system the surface resistance is decreased by up to 15%. Therewith emissivities $\epsilon<0.040$ are possible and specifically at a transmission above 88%.

An embodiment example of the invention is depicted in the drawing and will be described in the following in greater detail.

BRIEF DESCRIPTION OF THE FIGURES

FIG. 1 is an installation, and a schematic illustration of a coating installation, FIG. 2 is a layer structure on a substrate.

DETAILED DESCRIPTION

In FIG. 1 a coating installation 1 is depicted schematically. This coating installation 1 comprises an inward transfer lock chamber 2, a first coating chamber 3, a second coating chamber 4, a working chamber 5, a third coating chamber 6, a fourth coating chamber 7, and a fifth coating chamber 8.

A substrate 9 is moved by means of a (not shown) transport means from the inward transfer lock chamber 2 into the first coating chamber 3, in which $TiO_2$ is sputtered by means of an AC source 10. Here ceramic $TiO_x$ could also be sputtered by means of DC. The corresponding $TiO_2$ target has the reference number 11. After the substrate 9, which can be a glass pane, has been provided with a $TiO_2$ layer, the substrate 9 is transferred into the second coating chamber 4, where a ZnO target 13 is sputtered with the aid of a DC source 12. As soon as the required ZnO layer has been deposited on the $TiO_2$ layer, the substrate 9 is transferred into the working chamber 5. In it is disposed an ion source 14, which bombards the ZnO layer of substrate 9 with ions. The substrate subsequently is transferred into the third coating chamber 6, where a silver target 16 is sputtered by means of a DC source 15.

The ZnO layer underneath the silver serves as a bottom blocker. It has a strong effect on the properties of the silver layer. For example, it lowers the layer resistance of the silver, which corresponds to an improved electrical conductivity.

Hereby the capacity of the silver to reflect light is improved, since there is a direct correlation between the emissivity and the surface resistance of the coating system. The lower the surface resistance, the better is the thermal insulation of a coating.

The known decrease of the surface resistance of silver through a subjacent ZnO layer is still further improved according to the invention thereby that the ZnO layer is irradiated with ion beams. Therewith the emissivity of the silver layer is improved at identically high transmission for the wavelengths in the visible range.

The modification of the ZnO surface through the ions has a powerful effect on the epitaxial growth of the succeeding silver layer. The surface resistance of the silver is decreased by up to 20% without having to apply more silver.

The ions of the ion beam source 14 can be argon and/or oxygen ions. The penetration depth of the ions must not be too large in order for the layer beneath the ZnO layer not to be impacted. For that reason other types of radiation, e.g. electron beams or X-rays, are unsuitable for the treatment of ZnO.

The dose of the ions can be changed either through the adjustment of the gas flow of the ion beam source 14 or by varying the transport rate of substrate 9 under the ion beam source 14. The energy with which the ions impinge on the ZnO layer is set by the acceleration voltage.

Especially by setting the energy, the surface morphology of the ZnO layer can be changed. In this way the roughness is changed and the density can be affected. The surface can additionally be chemically activated or passivated. It is also possible in small measure to insert argon and/or oxygen atoms in the surface of the ZnO layer.

In particular, onto the layer surface an ion current is accelerated, which, for example is constant and determined by the type of gas and its quantity (e.g. 35 sccm Ar), the acceleration voltage (e.g. U=1 kV to U=3 kV), the current (I=0.5 A) and the distance of the ion source from the substrate (130 mm). sccm means (60 mbar l)/sec, where l denotes liter.

Consequently, the type of gas, its quantity per unit time and the acceleration voltage are set. The resulting current output by a current source is determined by these specifications. The geometric distance between substrate 9 and ion source 14 always remains constant.

Current and voltage of the power source are acquired by measuring instruments. The actual energy of the ion current cannot be measured.

The velocity of the substrate 9 determines the mean time per surface element in which the ion beam impinges on the substrate 9. Since the mean penetration depth of the ions is unknown, conversion to a volume element is not possible. But the effect in a volume is not the issue. Critical is the effect onto the surface. The surface roughness apparently has an indirect effect on the emissivity of the low-E coating.

If the ion current remains constant and the substrate velocity is divided in half, on average twice as many ions impinge with the same mean energy on the same surface element. Consequently, the ion dose is doubled. Therewith the energy application on the sample is also doubled. If the acceleration voltage is tripled, the mean ion energy in a first approximation is also tripled.

Consequently, the energy results as the product of the acceleration voltage and the reciprocal value of the substrate velocity.

After the silver layer has been sputtered onto the treated ZnO layer, the substrate is transferred into coating chamber 7, where, by means of a DC source 17, an NiCrO$_x$ target is sputtered. In the coating chamber 8, subsequently an Si$_3$N$_4$ target 20 is sputtered by means of an AC source 19.

The completely coated substrate 9 is depicted in FIG. 2. Evident is a relatively thick TiO$_2$ layer 21, on which is disposed a relatively thin ZnO layer 22. On this worked ZnO layer 22 is applied a relatively thin Ag layer 23. Upon the latter is applied a very thin NiCrO$_x$ layer 24. A relatively thick Si$_3$N$_4$ layer 25 forms the final layer.

Although five different layers 21-25 are shown in FIG. 2, what is critical in the invention are substantially only the layers 22 and 23. Therefore tests were carried out with a two-layer system of glass —ZnO—Ag, whose results are summarized in Table 1 below. The layer thickness of the silver was exactly identical in all tests and was approximately 7.6 nm.

TABLE 1

| Test Series | Gas | U (Ion) kVolt | Ar flow [sccm] | V (Ion) [m/min] | Dose [a.u.] | Energy [a.u.] | R/sq [Ohm] at 7.6 nm Ag | Diff. From Reference |
|---|---|---|---|---|---|---|---|---|
| Ref. | | | | | | | 10.8 | |
| Ion7 | Ar | 3 | 41 | 1 | 41 | 123 | 8.3 | 24.00% |
| Ion1 | Ar | 3 | 41 | 2 | 21 | 62 | 8.5 | 21.00% |
| Ion3 | Ar | 3 | 20 | 1 | 20 | 60 | 8.4 | 22.00% |
| Ion2 | Ar | 3 | 20 | 2 | 10 | 30 | 9.9 | 8.00% |
| Ion6 | Ar | 1 | 41 | 0.5 | 82 | 82 | 7.9 | 27.00% |
| Ion5 | Ar | 1 | 41 | 1 | 41 | 41 | 8.8 | 19.00% |
| Ion4 | Ar | 1 | 41 | 2 | 21 | 21 | 9.9 | 9.00% |

Dose and energy are given in "arbitrary units". To simplify, all values were normalized to a reference test with energy 1. The SI units of the dose in coulomb per kilogram and the SI unit of the energy in Newton-meters were not determined. Ion 7, Ion 1, etc. refer to the series of the performed tests. R/sq is the surface resistance.

Argon was used as the gas in all seven tests. The acceleration voltage was 1 or 3 kV, while the gas flow was either 20 or 41 sccm. The velocity V(Ion), with which the substrate 9 was moved, was between one and two meters per minute. The ion dose was between 10 and 82 units, and the kinetic energy was between 21 and 123 units.

While the surface resistance of the silver layer with untreated ZnO was 10.8 Ohm, the surface resistance in the case of treated ZnO was decreased by at least 8% to 27%.

Tests were also carried out with a coating comprising five layers. The result of these tests with respect to color values and surface resistance is compiled in Table 2.

TABLE 2

| Layer Sequence | Reference | Sample 1 | Sample 2 |
|---|---|---|---|
| Glass | 4 mm | 4 mm | 4 mm |
| TiO2 (nm) | 23 | 23 | 23 |
| ZnO | 15 | 15 | 15 |
| Ions | without | Type 1 | Type 2 |
| Ag (nm) | 9.2 | 9.2 | 9.2 |
| NiCrOx (nm) | 4 | 4 | 4 |
| Si3N4 (nm) | 35 | 35 | 35 |
| Data before Tempering | | | |
| Ty | 85.75 | 85.65 | 85.24 |
| a* | −0.9 | −0.53 | −0.52 |
| b* | −0.85 | −0.32 | −0.53 |
| RGy | 5.76 | 5.96 | 5.86 |
| a* | −2.78 | −5.19 | −5.17 |
| b* | 3.5 | 1.89 | 1.7 |
| RFy | 6.42 | 6.11 | 6.35 |
| a* | −3.2 | −5.43 | −5.31 |
| b* | 8.09 | 5.58 | 5.13 |
| Haze | 0.09 | 0.09 | 0.1 |
| R/sq | 6.2 | 5.4 | 5.7 |

Herein signify according to CIE LAB DIN 6174 (1976):
Ty = the transmission, averaged in the visible range, in percent
a* = color value on the red-green axis
b* = color value on the yellow-blue axis
RGy = the reflection, averaged in the visible range, from the glass side of the sample in percent
RFy = the reflection, averaged in the visible range, from the coating side of the sample in percent
Haze = opacity The above data refer to the coated substrate before tempering. Based on these data, it is evident that the layer resistance following ion treatment decreases significantly compared to the layer resistance of a layer not treated with ions.

Type 1, type 2, type 3 are ion energies, with type 1 denoting a higher, type 2 a medium and type 3 a low energy.

After the tempering, values are obtained, which are reproduced in the following Table 3.

TABLE 3

| Layer Sequence | Reference | Sample 1 | Sample 2 |
|---|---|---|---|
| Glass | 4 mm | 4 mm | 4 mm |
| TiO2 (nm) | 23 | 23 | 23 |
| ZnO | 15 | 15 | 15 |
| Ions | without | Type 1 | Type 2 |
| Ag (nm) | 9.2 | 9.2 | 9.2 |
| NiCrOx (nm) | 4 | 4 | 4 |
| Si3N4 (nm) | 35 | 35 | 35 |
| Data after Tempering | | | |
| Ty | 85.62 | 86.97 | 86.73 |
| a* | −0.42 | −0.35 | −0.27 |
| b* | −1.52 | −0.68 | −0.86 |
| RGy | 5.54 | 5.82 | 5.73 |
| a* | −1.71 | −3.46 | −3.64 |
| b* | 2.51 | 1.61 | 1.11 |
| RFy | 6.09 | 6.06 | 5.84 |
| a* | −2.15 | −3.15 | −3.57 |
| b* | 7.35 | 3.66 | 4.31 |
| Haze | 0.28 | 0.3 | 0.28 |
| R/sq | 5.2 | 4.5 | 4.8 |

In all cases lowering of the layer resistance is found after the treatment of the ZnO layer with ions. The minimal color deviations in the reflection colors can be traced back to the changed layer thickness of the ZnO.

The results of the test series reproduced in the following Table 4 also confirm that the transmission as well as also the surface resistance had been improved through the ion treatment of the ZnO layer.

TABLE 4

| Layer Sequence | Sample 3 | Reference |
|---|---|---|
| Glass | 4 mm | 4 mm |
| TiO2 (nm) | 23 | 23 |
| ZnO (nm) | 15 | 15 |
| Ions | Type 3 | without |
| Ag (nm) | 12 | 12 |
| NiCrOx (nm) | 5 | 5 |
| Si3N4 (nm) | 40 | 40 |
| O2 with Ag | 3 sccm | 3 sccm |
| Tempered Samples | | |
| Ty | 88.62 | 86.02 |
| a* | −2.05 | −1.24 |
| b* | 1.95 | 1.75 |
| RGy | 5.07 | 6.02 |
| a* | 4.52 | 3.23 |
| b* | −11.66 | −12.02 |
| RFy | 4.29 | 4.72 |
| a* | 6.79 | 5.87 |
| b* | −10.49 | −11.05 |
| Haze | 0.24 | 0.35 |
| R/sq | 3.1 | 3.4 |

It is understood that the invention is not limited to the described embodiment examples. For example, instead of the listed oxides, metals can also be reactively sputtered, which only form oxides when oxygen is supplied.

It is claimed:

1. A glass coating comprising:
    a) a first layer comprising at least one of ZnO, ZnO:Al, NiCr, NiCrO$_x$, TiO$_x$, TiO$_2$, W, WO, WO$_x$, Zr, ZrO$_x$, or ZrO, wherein the first layer is treated with accelerated ions; and
    b) a second infrared radiation-reflecting layer comprising a material having a silver fraction of at least 50%, said second layer being deposited on said first layer; wherein the glass coating is substantially transparent to visible light.

2. The glass coating as claimed in claim 1, wherein the second infrared radiation-reflecting layer consists of pure silver.

3. The glass coating as claimed in claim 1, wherein the first layer comprises a material having a ZnO fraction of at least 50%.

4. The glass coating as claimed in claim 1, wherein the first layer consists of pure ZnO.

5. The glass coating as claimed in claim 1, wherein the layer treated by ion irradiation comprises ZnO$_x$ or ZnO:Al or Zn:AlO$_x$ wherein $0 < x \leq 1$.

6. The glass coating as claimed in claim 1, wherein the ion irradiation comprises Ar ions.

7. The glass coating as claimed in claim 1, wherein the ion irradiation comprises oxygen ions.

8. The glass coating as claimed in claim 1, wherein the ion irradiation comprises a mixture of O$_2$ and Ar.

9. The glass coating as claimed in claim 1, wherein the first layer is applied directly to the second layer.

10. A glass coating comprising the layer sequence glass-TiO$_2$-ion irradiation worked ZnO—Ag—NiCrO$_x$—Si$_3$N$_4$.

11. A coated glass comprising:
    a) a glass substrate; and
    b) a coating on said glass substrate that is substantially transparent to visible light, wherein said coating comprises a first layer and a second layer deposited on said first layer;

wherein said first layer comprises at least one of ZnO, ZnO:Al, NiCr, NiCrO$_x$, TiO$_x$, TiO$_2$, W, WO, WO$_x$, Zr, ZrO$_x$, or ZrO and is treated with accelerated ions; and said second layer is an infrared radiation-reflecting layer and comprises a silver fraction of at least 50%.

12. A glass coating comprising:
    a) an accelerated ion-treated first layer comprising at least one of ZnO, ZnO:Al, NiCr, NiCrO$_x$, TiO$_x$, TiO$_2$, W, WO, WO$_x$, Zr, ZrO$_x$, or ZrO, and
    b) a second infrared radiation-reflecting layer comprising a material having a silver fraction of at least 50%, said second layer being deposited on said first layer;
    wherein the glass coating is substantially transparent to visible light.

13. A method comprising for producing a glass coating comprising applying a first layer on glass, wherein the first layer comprises at least one of ZnO, ZnO:Al, NiCr, NiCrO$_x$, TiO$_x$, TiO$_2$, W, WO, WO$_x$, Zr, ZrO$_x$, or ZrO;
    subsequently treated the first layer with accelerated ions after the first layer is applied; and
    after said treatment applying a second infrared-radiation reflecting layer on said first layer,
    wherein said second layer comprises a material having a silver fraction of at least 50%;
    wherein the coating is substantially transparent to visible light.

14. The method as claimed in claim 13, wherein said first layer substantially comprises ZnO and is applied by sputtering.

15. The method as claimed in claim 13, wherein the second layer substantially comprises Ag and is applied by sputtering.

16. The method as claimed in claim 13, wherein the infrared radiation-reflecting layer comprises pure silver.

17. The method as claimed in claim 13, wherein the layer treated by ion irradiation comprises a material with a ZnO fraction of at least 50%.

18. The method as claimed in claim 13, wherein the layer treated by ion irradiation comprises pure ZnO.

19. A method of applying a coating on glass comprising the steps of:
    a) applying a TiO$_2$ layer on glass by sputtering;
    b) applying a ZnO layer on the TiO$_2$ layer by sputtering;
    c) irradiating the ZnO layer with ion irradiation;
    d) applying an Ag layer onto the ZnO layer by sputtering;
    e) applying a NiCrO$_x$ layer onto the Ag layer by sputtering; and
    f) applying an SbN$_4$ layer onto the NiCrO$_x$ layer by sputtering.

* * * * *